F. EVERETT.
GEARING FOR MOTOR VEHICLES.
APPLICATION FILED JAN. 16, 1908.
919,564.
Patented Apr. 27, 1909.
2 SHEETS—SHEET 1.
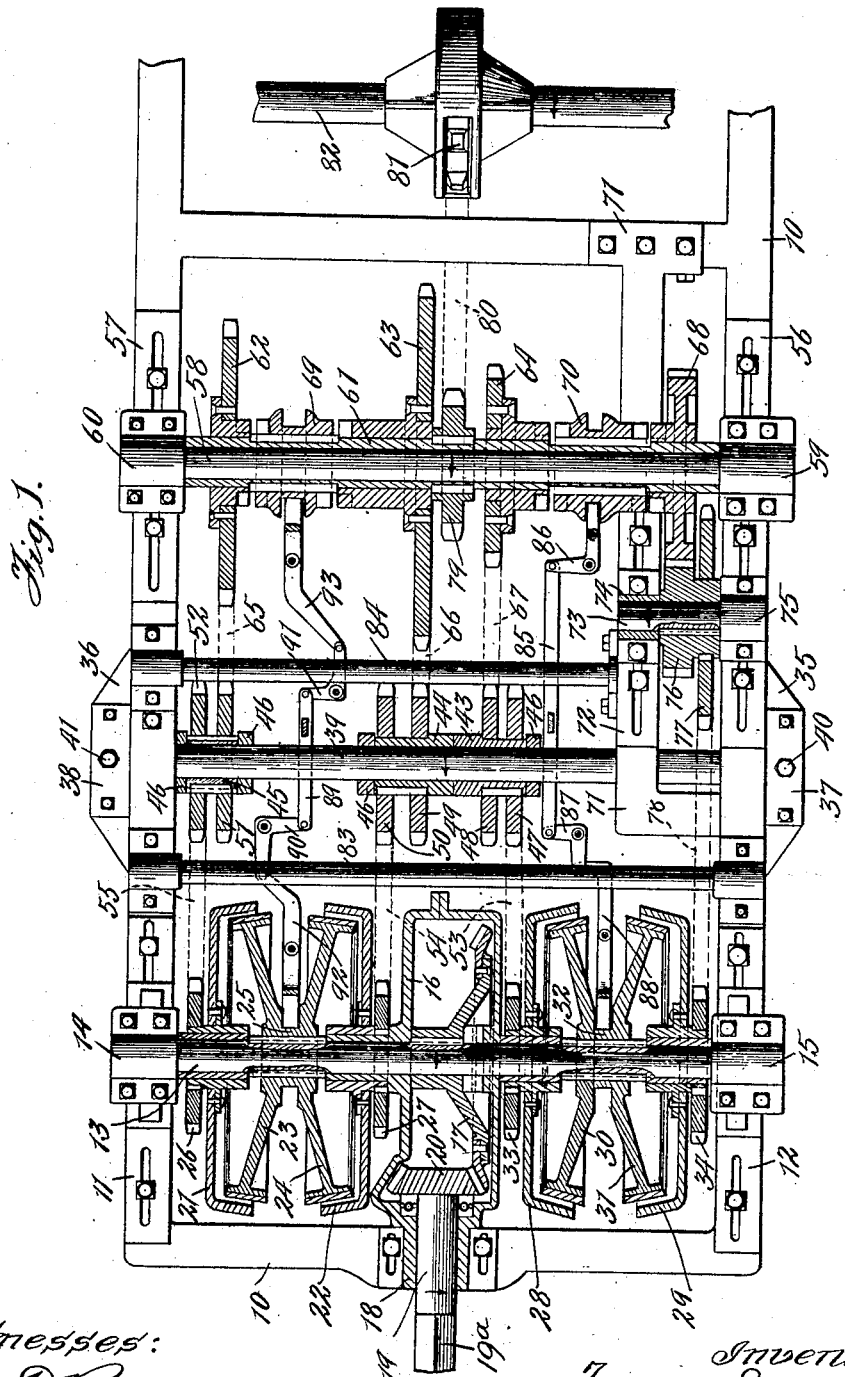

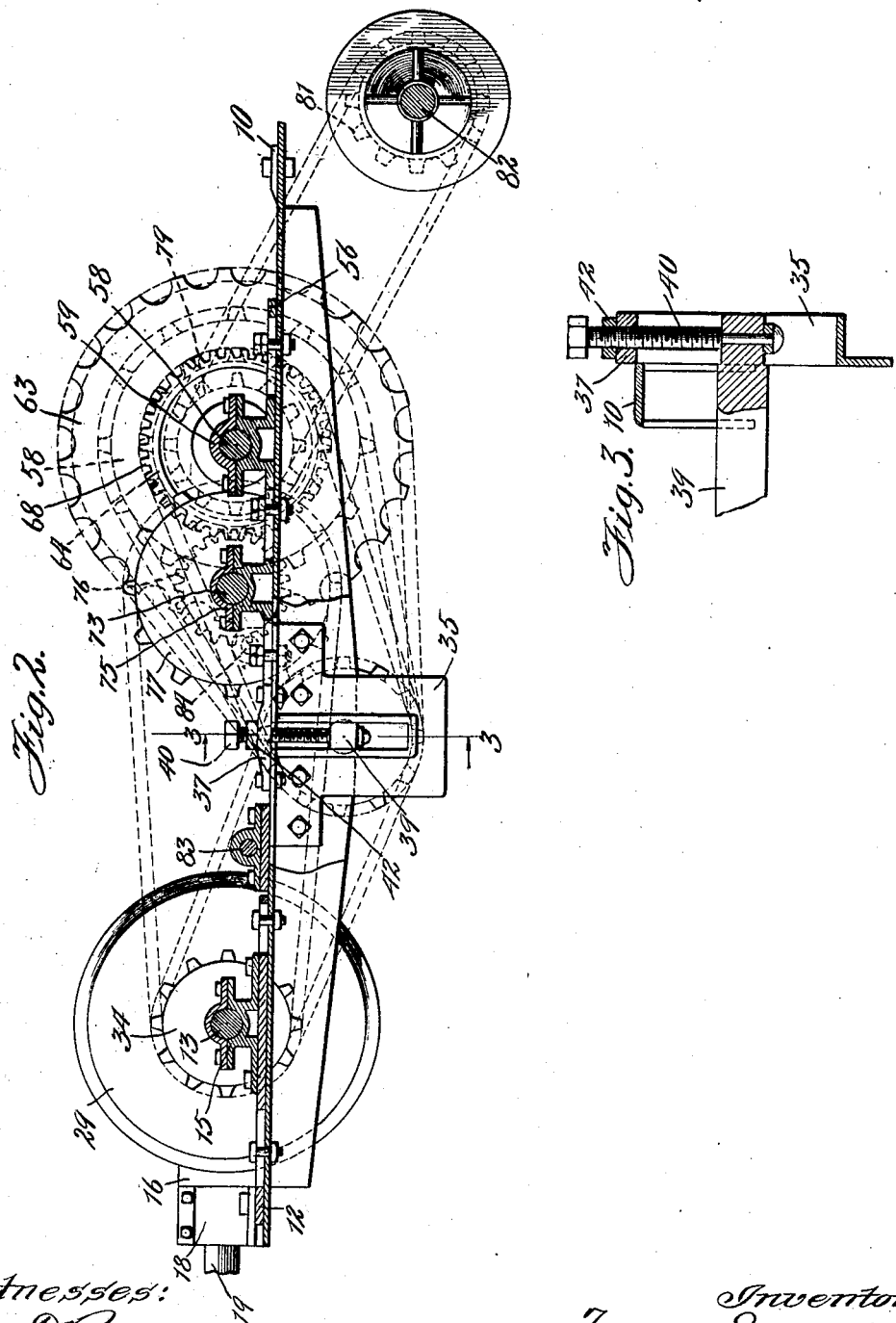

UNITED STATES PATENT OFFICE.

FRANK EVERETT, OF SAN JOSE, CALIFORNIA.

GEARING FOR MOTOR-VEHICLES.

No. 919,564.  Specification of Letters Patent.  Patented April 27, 1909.

Application filed January 16, 1908. Serial No. 411,114.

*To all whom it may concern:*

Be it known that I, FRANK EVERETT, a citizen of the United States, residing at San Jose, county of Santa Clara, State of California, have invented certain new and useful Improvements in Gearing for Motor-Vehicles, of which the following is a specification, reference being had to the accompanying drawings.

My invention relates to motor vehicles, and has particularly to do with the transmission mechanism.

It has for its objects to provide a new and improved means for regulating the tension of the various chains employed which shall do away with the difficulties heretofore encountered and to otherwise generally improve mechanisms of this class. I accomplish these objects by the means shown in the accompanying drawings and hereinafter specifically described.

That which I believe to be new will be set forth in the claims.

In the drawings:—Figure 1 is a plan view, partly in section, of my device. Fig. 2 is a side elevation, partly in section, of the device shown in Fig. 1. Fig. 3 is an enlarged detail, being a cross section at line 3 3 of Fig. 2.

Referring to the several figures of the drawings, in which corresponding parts are indicated by like reference characters, 10 indicates a part of the frame of a motor vehicle, the side members of this frame being formed of channel-irons, as shown in Fig. 3.

11 12 indicate two plates secured by bolts to the frame 10, the openings in the plates 11 12 for the bolts being elongated so as to enable the plates to be shifted back and forth relative to the frame 10.

13 indicates the drive shaft secured in bearings 14 15 which are, in the construction shown, bolted to the plates 11 12, respectively. Loosely mounted upon the shaft 13, is a box 16 inclosing a gear 17 keyed upon said shaft 13. At the forward end of this box 16 is formed a bearing 18 for a shaft 19 which carries upon its rear end a bevel gear 20 which meshes with the gear 17. As shown, the bearing 18 is adjustably secured to the frame 10 by bolts passing through appropriate slots. The forward end of the shaft 19 is shown squared, as at 19ᵃ, to adapt it to receive power from the engine through a suitable telescopic joint, as will be readily understood.

21 22 indicate two clutch members, provided at one end of the drive shaft 13. The members 21 22 are similar, and are arranged opposite each other upon the shaft 13, being loosely mounted thereon so that the shaft may rotate independently thereof. Said clutch members are adapted to coöperate with clutch members 23 24 carried at opposite ends of a sleeve 25 mounted on the shaft 13 between the clutch members 21 22. In the construction shown, the clutch members 23 24 are integral with the sleeve 25, but they may be otherwise formed. The sleeve 25 is so mounted on the shaft 13 as to rotate therewith but as to be movable longitudinally thereon, in the construction shown being feathered on said shaft. The clutch members 21 23 coöperate to form a friction clutch, and likewise the clutch members 22 24 so coöperate to form a second friction clutch. By moving the sleeve 25 in one direction upon the shaft 13 and holding it there, the clutch members 21 23 are brought into operative engagement, while by moving the said sleeve 25 in the opposite direction the clutch members 22 24 are brought into operative engagement. The clutch member 21 is provided with a sprocket wheel 26, and the clutch member 22 with a sprocket wheel 27, said sprocket wheels, in the construction shown, being keyed to their respective clutch members. The shaft 13 is also provided at its opposite end with two similar clutches,—28 29 being the outer clutch members, 30 31 being the inner clutch members, 32 being the sleeve with which the clutch members 30 31 are formed, and 33 34 being the gears keyed upon the clutch members 28 29, respectively.

From the foregoing description, it is evident that only that one of the four sprockets carried by the shaft 13 will rotate which is brought into operative engagement with said shaft through the medium of one of the sleeves 25 32 and the corresponding clutch members.

35 36 indicate two U-shaped angle-irons bolted to the frame 10 at about its longitudinal central point, the flanges of the channel-irons forming the side members of the frame 10 being there cut away for the purpose hereinafter seen.

37 38 indicate two plates bolted across the open ends of the U-shaped pieces 35 36, respectively. 39 indicates a shaft squared at both ends to adapt it to slide up and down in said U-shaped pieces as hereinafter described. 40 41 indicate two screw-threaded pins, each provided with a jam-nut 42 and passing through a screw-threaded opening in the plate 37 or 38, the lower end of the pin passing through a suitable hole through the end of the shaft 39 and being secured against withdrawal therefrom. It is evident that the shaft 39 may be readily raised or lowered by merely turning the pins 40 41 in one direction or the other by applying a suitable wrench to the heads of such pins. Loosely mounted upon said shaft 39 are three sleeves 43 44 45, being secured against lateral movement thereon by suitable washers 46. Upon said sleeves 43 44 45 are keyed sprocket wheels 47 and 48, 49 and 50, 51 and 52, respectively, sprocket wheels 47, 50, and 52 being in alinement, respectively, with sprocket wheels 33, 27 and 26, and being connected therewith by sprocket chains 53, 54 and 55, which are indicated by dotted lines for clearness of illustration. It is thus seen that whenever motion is imparted to one of the sprocket wheels 33 27 26, according to the position of the sleeves 25 32, as hereinabove explained, that motion is transmitted to the corresponding one of the sprocket wheels 48 49 51.

56 57 indicate two plates bolted to the frame 10, the openings in the plates 56 57 for the bolts being elongated to enable the plates to be shifted back and forth relative to the frame 10. 58 indicates a shaft secured in bearings 59 60 which, in the construction shown, are formed integral with the said plates 56 57.

61 indicates a sleeve loosely mounted on the shaft 58.

62 63 64 indicate three different sized sprocket wheels loosely mounted on the sleeve 61 in alinement, respectively, with sprocket wheels 51 49 and 48, and connected therewith by sprocket chains 65 66 67. 68 indicates a gear loosely mounted on said sleeve 61. Between the sprocket wheels 62 63, and between the sprocket wheel 64 and gear 68 are two sleeves 69 70, respectively, so mounted as to slide on said sleeve 61 but so as to rotate therewith, in the construction shown being feathered thereon. The ends of the sleeves 69 70 are provided with ratchet teeth adapted to engage with corresponding ratchet teeth on the adjacent faces of the sprocket wheels and gear when the said sleeves are moved into contact with said sprocket wheels or gear, as hereinafter explained. The ratchet teeth are such that when motion is imparted, through the train of mechanism described, to one of the sprocket wheels 62 63 64, in the direction in which it is designed to be driven, they will serve to rotate the corresponding sleeve 69 70, thus rotating the sleeve 61 upon which said sleeves 69 70 are feathered, the rotation being in such a direction that the vehicle will be driven forward, as will be hereafter seen. The ratchet teeth on the gear 68, however, and on the adjacent end of the sleeve 70 are such that when motion is imparted to the gear 68 in the direction in which it is designed to be driven through the train of mechanism hereinafter described, they will serve to rotate the sleeve 70, and consequently the sleeve 61, in such direction that the vehicle will be driven backward.

71 indicates an L-shaped plate bolted, or otherwise firmly secured, to the frame 10 to form a support for one end of a short counter-shaft hereinafter referred to.

72 indicates a plate bolted to the plate 71, the openings in the plate 72 for the bolts being elongated to enable the plate 72 to be shifted back and forth relative to the plate 71.

73 indicates a counter-shaft mounted in bearings 74 75, which, in the construction shown, are formed integral with the plates 72 56, respectively, but may be in any other suitable manner thereto attached. Keyed upon this shaft 73 is a gear 76 which meshes with the gear 68. Secured to said gear 76 so as to rotate therewith is a sprocket wheel 77 in alinement with the sprocket wheel 34 and connected therewith by a sprocket chain 78, indicated by dotted lines.

Keyed upon the sleeve 61 is a sprocket wheel 79 connected by a sprocket chain 80 with a sprocket wheel 81 mounted upon the rear axle 82 of the machine so as to rotate therewith.

83 84 indicate brace rods extending between the side members of the frame 10.

Inasmuch as the specific means for shifting the sleeves 25 32 69 and 70 forms no part of my invention, I have for clearness of illustration omitted the supporting means therefor.

85 indicates a link adapted to be moved longitudinally of itself at the will of the operator of the machine and held in position by any suitable means. The rear end of the link 85 is pivotally connected with one arm of a bell-crank lever 86, the other arm of which is provided with a yoke of the ordinary type for such shifting work. The opposite end of the link 85 is pivotally connected with one arm of a bell-crank lever 87, the other arm of which is pivotally connected with one end of the lever 88, the other end of which is provided with a shifting yoke similar to that on the bell crank lever 86. It will be seen that when the link 85 is moved toward the rear, the sleeve 70 will be moved into contact with the gear 68, and the clutch member 31 into contact with the clutch member 29, while if the said link be given a forward movement to the limit of its motion, the sleeve 70 will be brought into contact with the sprocket wheel 64 and the clutch member 30 into contact with the clutch member 28. In like manner, by the use of link 89, bell-crank levers 90 and 91, and shifting levers 92 and 93, the sleeves 69 and 25 are moved simultaneously in one direction or the other.

Referring now to the operation of the machine in general, the shaft 19 is to be rotated in the direction indicated by the arrow in Fig. 1, giving the shaft 13 rotation in the direction indicated by the arrow thereon. If then the sleeves 25 and 69 be forced simultaneously by means of the link 89 in one direction or the other, or if the sleeves 32 and 70 be forced simultaneously by means of the link 85 into engagement with the sprocket wheels 33 and 64, one or the other of the sleeves 45 44 43 will be rotated in the direction indicated by the arrow on the shaft 39, giving to the sleeve 61 a rotation in the direction of the arrow on the shaft 58, rotating the axle 82 in the direction indicated by the arrow thereon and imparting to the machine a forward movement. If, however, the link 85 is forced to the rear, the sleeve 32 is forced into engagement with sprocket wheel 34, causing rotation of the shaft 73 in the direction of the arrow thereon. The sleeve 70 having been shifted simultaneously with the sleeve 32 and in the same direction by the action of the link 85, as hereinabove explained, the sleeve 61 is thus given a rotation in the reverse direction from that indicated by the arrow on shaft 58, thus causing rotation of the axle 82 in the reverse direction from that indicated by the arrow thereon, thus imparting to the machine a backward movement.

Referring now particularly to the regulation of the tension of the chains, it will be understood that the axle 82 is firmly fixed relative to the frame 10. It has been a very difficult thing to properly regulate the tension of the chain 80 by the ordinary methods, but by my improvements the regulation of the tension of this chain and of all the other chains is a very easy matter. Having loosened all the bolts holding the adjustable plates and the bearing 18 in place relative to the frame 10, the length of the chain 80 having been regulated as nearly as may be by any desired change in the number of links in the chain, the shaft 58 is moved forward until the chain 80 is of exactly the proper tension, when the bolts securing in place plates 56, 57 and 72 are tightened. The shaft 39 is then moved downward by means of the screw-threaded pins 40 and 41 until the chains 65, 66 and 67 have the proper tension. The distance which the shaft 39 may be moved up and down by means of the pins 40 and 41 is great enough that considerable leeway is allowed in the number of links in the several chains connecting said shaft 39 with the shaft 58. If then chains 65, 66 and 67 are composed of links of slightly different lengths, it is an easy matter to regulate the position of the shaft 39 so that the chains, even though of different lengths, shall all be approximately the proper lengths. After this first regulation of the position of the shaft 39 and the number of links in the various chains 65, 66 and 67, no change in the position of the shaft 39 is required except to provide for the stretch of those chains, and in general that will be uniform enough in the three chains so that the number of links in the chains will not again have to be changed. After the chains 65, 66 and 67 have been given the proper tension by means of the pins 40 and 41 being turned as explained, the shaft 13 is moved forward until the chains 53, 54 and 55 have the proper tension, when the bolts securing in place the plates 11 and 12 and the bearing 18 are tightened.

Inasmuch as the chain 78 is not used to a very great extent, and that at a very low speed, the length of this chain may be disregarded. If its length is such as to interfere with the proper regulation of the remainder of the chains, by preventing the shaft 13 from being moved forward to the proper point, it may be lengthened by the insertion of one or more additional links as may be necessary, and if it is found to be too long, one or more links may be removed.

By my invention I have provided an easy and ready means for maintaining the proper tension of the chains in the transmission system shown, thus diminishing the noise of the machine, materially lengthening the life of the chains, and insuring against accident due to chains of improper length.

What I claim as my invention and desire to secure by Letters Patent is:—

1. In a transmission mechanism, the combination of a shaft, a second shaft parallel therewith and adjustable laterally relative thereto, a plurality of pairs of alined sprocket wheels on said shafts, and a chain connecting each pair of sprocket wheels, the velocity ratio and the pitch of each pair of sprocket wheels being different from the velocity ratio and the pitch, respectively, of the other pairs of sprocket wheels.

2. In a motor vehicle, the combination of a rear axle, a driven shaft from which said axle is driven, a drive shaft, a shaft intermediate said drive shaft and said driven shaft, said shafts being adjustable laterally relative to each other, two sprocket wheels secured on said intermediate shaft, a sprocket wheel secured to each of said other two shafts one in alinement with each of said sprocket wheels on said intermediate shaft, chains connecting said alined sprocket wheels, a pair of alined sprocket wheels secured on said driven shaft and said rear axle, and a chain connecting said last-named pair of sprocket wheels.

3. In a motor vehicle, the combination of a rear axle, a driven shaft from which said axle is driven, a drive shaft, said drive shaft and said driven shaft being adjustable back and forth relative to said axle, a shaft intermediate said drive shaft and said driven shaft, said intermediate shaft being adjustable up and down, two sprocket wheels secured on said intermediate shaft, a sprocket wheel secured on each of said other two shafts one in alinement with each of said sprocket wheels on said intermediate shaft, chains connecting said alined sprocket wheels, a pair of alined sprocket wheels secured on said driven shaft and said rear axle, and a chain connecting said last-named pair of sprocket wheels.

4. In a motor vehicle, the combination of a rear axle, a driven shaft from which said axle is driven, a drive shaft, said drive shaft and said driven shaft being adjustable back and forth relative to said axle, a shaft intermediate said drive shaft and said driven shaft, said intermediate shaft being adjustable up and down, two sprocket wheels secured on said intermediate shaft, a sprocket wheel secured to each of said other two shafts one in alinement with each of said sprocket wheels on said intermediate shaft, chains connecting said alined sprocket wheels, a pair of alined sprocket wheels secured on said driven shaft and said rear axle, a chain connecting said last-named pair of sprocket wheels, and independent means for reversing the operation of said driven shaft.

5. In a motor vehicle, the combination of a rear axle, a driven shaft from which said axle is driven, a drive shaft, said drive shaft and said driven shaft being adjustable back and forth relative to said axle, a shaft intermediate said drive shaft and said driven shaft, said intermediate shaft being adjustable up and down, two sprocket wheels secured on said intermediate shaft, a sprocket wheel secured on each of said other two shafts one in alinement with each of said sprocket wheels on said intermediate shaft, chains connecting said alined sprocket wheels, a pair of alined sprocket wheels secured on said driven shaft and said rear axle, a chain connecting said last-named pair of sprocket wheels, intermeshing gears for reversing the operation of said driven shaft, a pair of alined sprocket wheels secured on said reversing gears and said drive shaft, and a chain connecting said last-named gears.

6. In a motor vehicle, the combination of a rear axle, a driven shaft from which said axle is driven, a drive shaft, said drive shaft and said driven shaft being adjustable back and forth relative to said axle, a shaft intermediate said drive shaft and said driven shaft, said intermediate shaft being adjustable up and down, a pair of alined sprocket wheels on said drive shaft and said intermediate shaft, a chain connecting said sprocket wheels, a plurality of pairs of sprocket wheels of different velocity ratios secured on said intermediate shaft and said driven shaft, a chain connecting each of said pairs of sprocket wheels, a pair of alined sprocket wheels on said driven shaft and said rear axle, and a chain connecting said last-named pair of sprocket wheels.

7. In a motor vehicle, the combination of a rear axle, a driven shaft from which said axle is driven, a drive shaft, said drive shaft and said driven shaft being adjustable back and forth relative to said axle, a shaft intermediate said drive shaft and said driven shaft, said intermediate shaft being adjustable up and down, a pair of alined sprocket wheels on said drive shaft and said intermediate shaft, a chain connecting said sprocket wheels, a plurality of pairs of sprocket wheels of different velocity ratios secured on said intermediate shaft and said driven shaft, a chain connecting each of said pairs of sprocket wheels, a pair of alined sprocket wheels on said driven shaft and said axle, a chain connecting said last-named pair of sprocket wheels, intermeshing gears for reversing the operation of said driven shaft, a pair of alined sprocket wheels secured on said reversing gears and said drive shaft, and a chain connecting said last-named gears.

8. In a motor vehicle, the combination of a rear axle, a driven shaft from which said axle is driven, a drive shaft, said driven shaft and said drive shaft being adjustable back and forth relative to said axle, a shaft intermediate said drive shaft and said driven shaft, said intermediate shaft being adjustable up and down, different-sized sprocket wheels on said shafts, chains connecting sprocket wheels on said drive shaft and said intermediate shaft and chains connecting sprocket wheels on said intermediate shaft and said driven shaft whereby said driven shaft may be rotated at variable speeds, a pair of alined sprocket wheels on said driven shaft and said rear axle, and a chain connecting said last-named pair of sprocket wheels.

FRANK EVERETT.

Witnesses:
JOHN W. SULLIVAN.
J. B. PECKHAM.